United States Patent
DeWitt

(10) Patent No.: US 8,686,718 B2
(45) Date of Patent: Apr. 1, 2014

(54) MAGNETIC SHUTTER BLADE POSITION SENSING METHOD

(75) Inventor: Frank DeWitt, Lima, NY (US)

(73) Assignee: CVI Laser, LLC, Rochester, NY (US)

( * ) Notice: Subject to any disclaimer, the term of this patent is extended or adjusted under 35 U.S.C. 154(b) by 534 days.

(21) Appl. No.: 12/924,350

(22) Filed: Sep. 24, 2010

(65) Prior Publication Data

US 2011/0116150 A1    May 19, 2011

Related U.S. Application Data

(60) Provisional application No. 61/277,509, filed on Sep. 25, 2009.

(51) Int. Cl.
*G01B 7/30* (2006.01)

(52) U.S. Cl.
USPC ..................................... 324/207.25

(58) Field of Classification Search
CPC ........................................ G01B 7/30
USPC ..................................... 324/207.25
See application file for complete search history.

(56) References Cited

U.S. PATENT DOCUMENTS

| 5,917,303 A * | 6/1999 | Depatie et al. ............ 318/685 |
| 2012/0201529 A1 * | 8/2012 | Viglione et al. .......... 396/453 |

* cited by examiner

*Primary Examiner* — Bot Ledynh
(74) *Attorney, Agent, or Firm* — Steven R. Scott

(57) ABSTRACT

The instant invention senses shutter blade position indirectly by sensing the position of rotor(s) driving the shutter blade in an electromagnetically driven actuator system. It generally comprehends systems where a plurality of rotors each drive respective blades of a shutter such that the position of each of the rotors is indicative of the position of their respective shutter blades, and combines such systems with non-optical sensors responsive to the rotors which signal the position of the shutter blades based on the position of the rotors. The non-optical sensors used are preferably responsive to the magnetic fields produced by the rotors, and can be advantageously positioned adjacent stator poles associated with the rotors, which stator poles are associated with the open or closed positions of the shutter blades. The sensors are preferably Hall Effect (Hall IC) sensors producing voltages proportionate to and greatest when the pole of a magnet is proximate the Hall Effect sensor. Thus, the system can be arranged with sensors adjacent stator poles associated with a closed blade/shutter configuration, or arranged with sensors adjacent stator poles associated with an open blade/shutter configuration, so that the voltage signal produced is highest/lowest for either a closed/open shutter condition or the opposite.

14 Claims, 6 Drawing Sheets

RDS Blade Sensing – Prototype Circuit

Hall IC Actuator 1

Hall IC Actuator 2

$V_{low}$ when both blades are in closed position

12 V    Ground    Out
$V_{high}$ = 3.0 +/- 0.3
$V_{low}$ = < 0.5

| Blade 1 | Blade 2 | Out |
|---------|---------|------|
| Open | Open | High |
| Open | Closed | High |
| Closed | Open | High |
| Closed | Closed | Low |

MAGNETIC SHUTTER BLADE POSITION SENSING METHOD

RELATED APPLICATIONS

This application claims an invention that was disclosed in U.S. Provisional Application No. 61/277,509, filed 25 Sep. 2009, entitled "Magnetic Shutter Blade Position Sensing Method". The benefit under 35 USC §119(e) and/or other applicable law of the aforesaid United States provisional application is hereby claimed, and the aforementioned application is hereby incorporated herein by reference.

BACKGROUND OF THE INVENTION

1. Field of the Invention

The invention pertains to the field of shutter blade position sensors for optical shutters. More particularly, the invention describes a means for sensing shutter blade position that is of particular applicability where the blades of an optical shutter are driven by a rotor magnet.

2. Description of the Related Art

The primary competing technology for shutter blade position sensing is optical and involves an infra-red (IR) emitter and receiver used to sense the presence (or absence) of the blade. However, this arrangement is complex and leads to the possibility of stray IR emission. This is particularly problematic given the fact that many shutters are used with or within IR based cameras, viewers, and sites. Thus, a technology that could avoid the use of IR in detecting shutter position is inherently useful and beneficial.

SUMMARY OF THE INVENTION

The instant invention senses shutter blade position indirectly by sensing the position of rotor(s) driving the shutter blade in an electromagnetically driven actuator system. This is preferably accomplished via the use of a Hall Effect sensor (i.e., a Hall IC) in close proximity to the actuator. It is of particular applicability and most easily effectuated in shutters where blade(s) are directly driven by a rotor magnet. Thus, in terms of an overview, the shutter blade position sensing system of the instant invention generally comprehends systems where a plurality of rotors each drive respective blades of a shutter such that the position of each of the rotors is indicative of the position of their respective shutter blades, and combines such systems with non-optical sensors responsive to the rotors which signal the position of the shutter blades based on the position of the rotors. The non-optical sensors used are preferably responsive to the magnetic fields produced by the rotors, and can be advantageously positioned adjacent stator poles associated with the rotors, which stator poles are associated with the open or closed positions of the shutter blades. In the preferred embodiments illustrated and discussed, the sensors are Hall Effect (Hall IC) sensors producing voltages in response to the proximity of the pole of a magnet to the Hall Effect sensor.

DESCRIPTION

Figure 1:
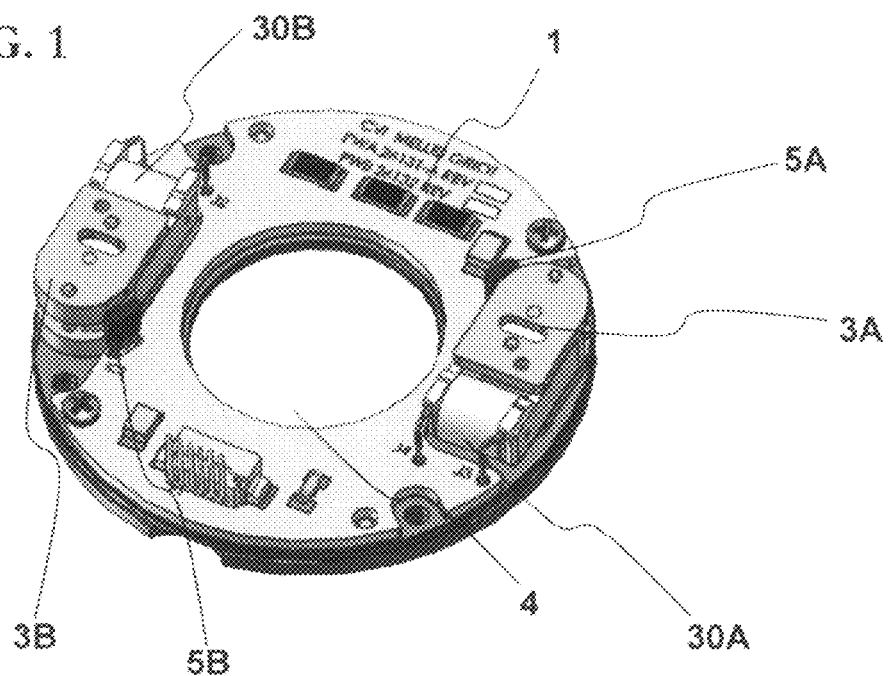
FIG. 1 provides a schematic perspective view of a shutter mechanism in accordance with the teachings of the invention.
Figure 2:
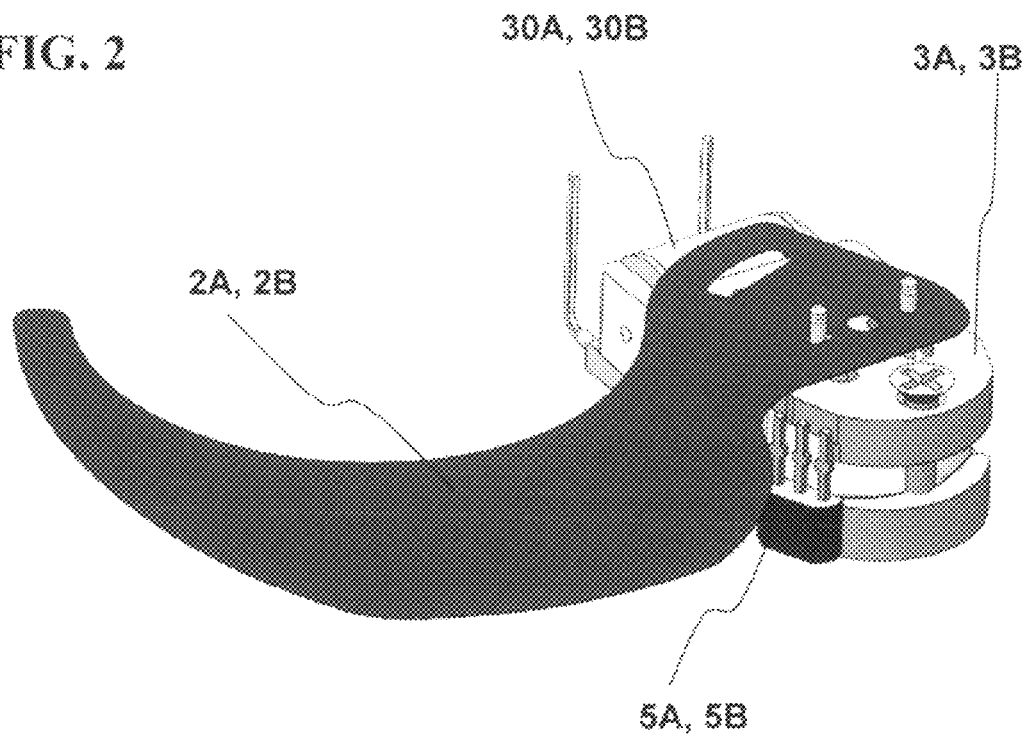
FIG. 2 provides an inverted perspective view of an actuator module with attached shutter and sensor in accordance with the teachings of the invention.
Figure 3A:
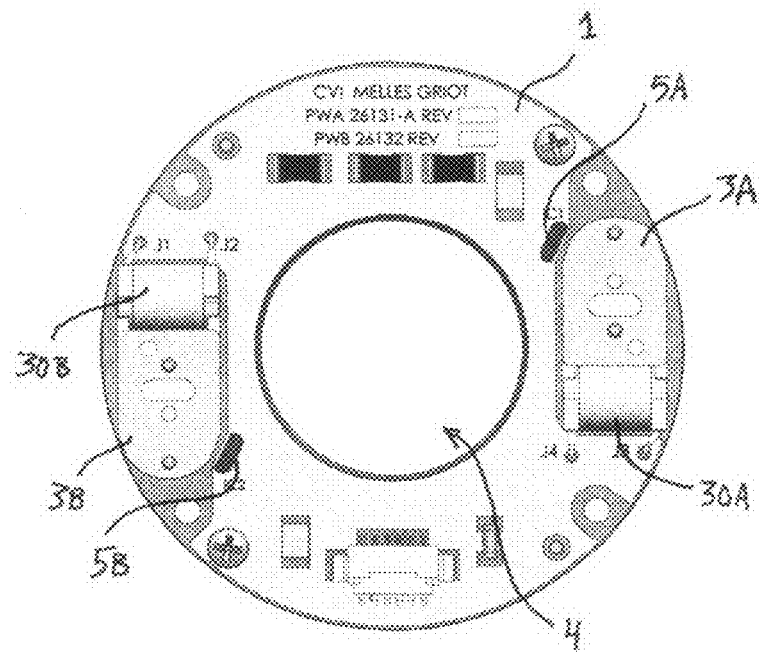
FIG. 3A provides a schematic overhead view of the shutter mechanism of FIG. 1, where both shutter blades are open.
Figure 3B:
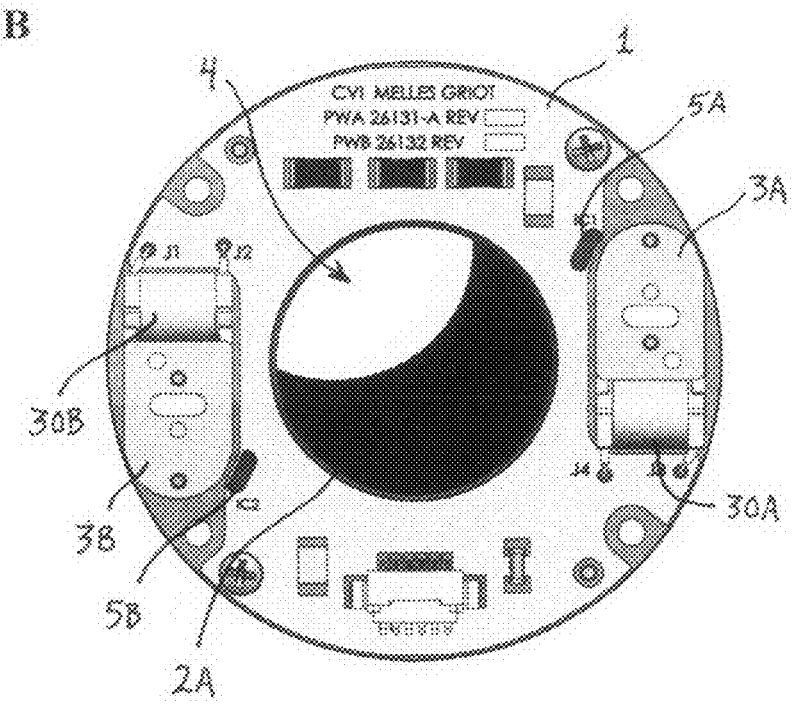
FIG. 3B provides a schematic overhead view of the shutter mechanism of FIG. 1, where a first shutter blade is closed.
Figure 3C:
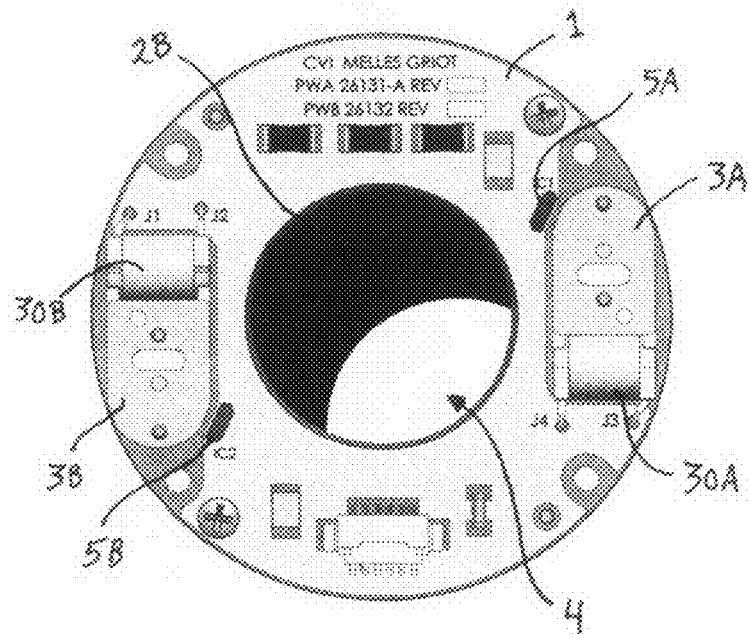
FIG. 3C provides a schematic overhead view of the shutter mechanism of FIG. 1, where a second shutter blade is closed.
Figure 3D:
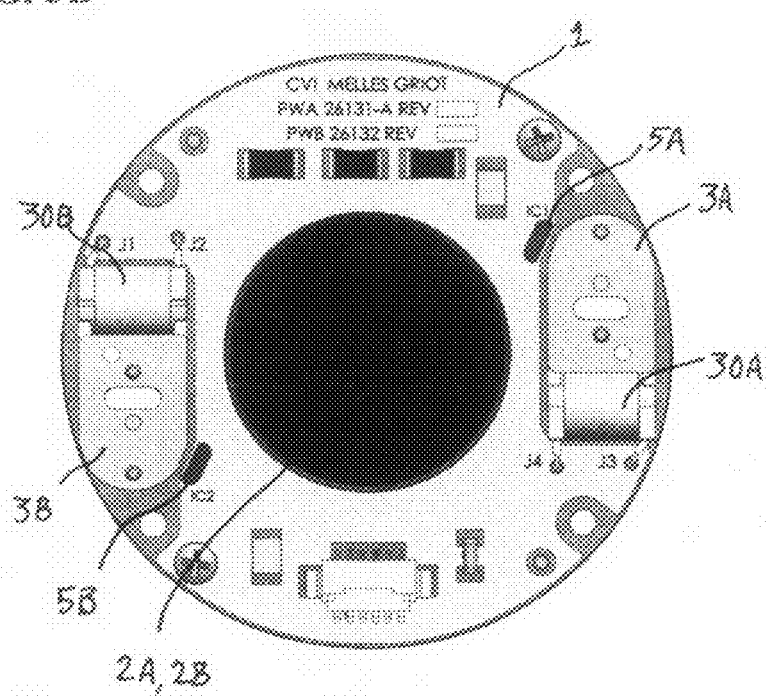
FIG. 3D provides a schematic overhead view of the shutter mechanism of FIG. 1, where both shutter blades are closed.

In its preferred embodiments, and as illustrated in the drawing figures, the present invention is based upon and utilizes a relatively new technology for shutter actuation, a magnetic rotor directly connected to and driving the rotation of optical shutter blades. An iron structure (stator) is arranged around the rotor and conducts magnetic flux from the rotor through the iron core of one or more electro-magnet drive coils. The stator shape is arranged so that, as the rotor rotates over its range of travel, the flux through the electromagnet drive coil core varies in magnitude and direction. A drive current through the electromagnet drive coil thus induces a torque to the rotor, to open or close the shutter blade.

Turning to FIGS. 1 through 4B, it will be observed that the inventive concepts can be advantageously embodied in and utilized with the aforesaid drive system. This figure illustrates a shutter body 1 having a shutter blade 2A (also referred to as the "first shutter blade" or "blade 1") and a shutter blade 2B (also referred to as the "second shutter blade" or "blade 2") directly driven, respectively, by a first rotary magnet shutter actuator 3A and a second rotary magnet shutter actuator 3B, so as to open or occlude an aperture 4.

Figure 4A:
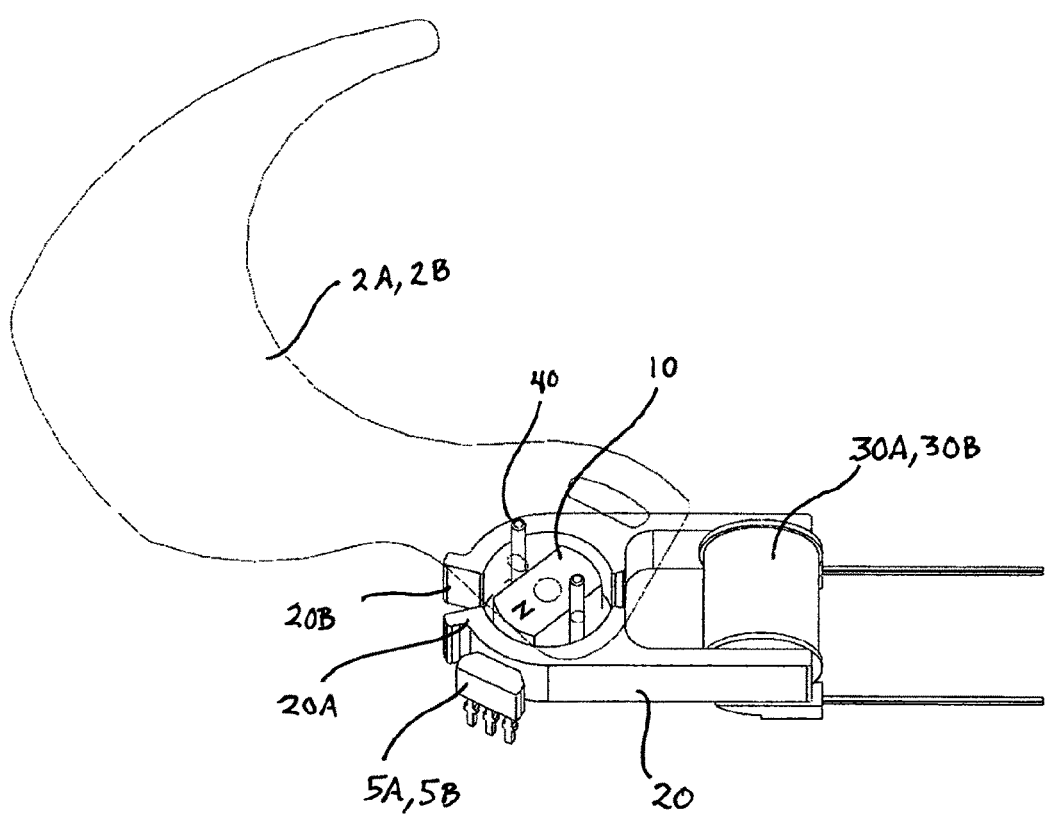
FIG. 4A provides a schematic perspective view illustrating the relative positions of the components of the invention where a shutter blade is in an open position.
Figure 4B:
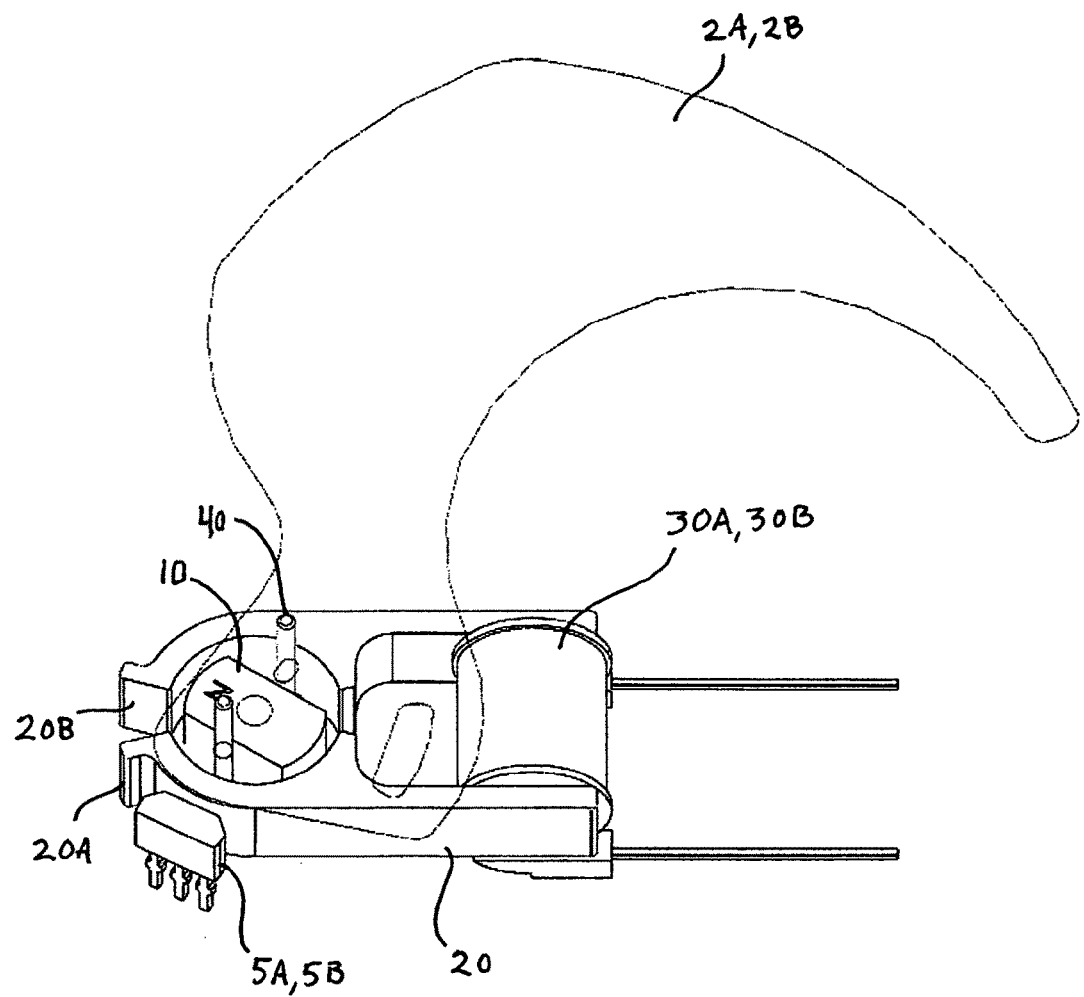
FIG. 4B provides a schematic perspective view illustrating the relative positions of the components of the invention where a shutter blade is in a closed position FIG. 5 provides a schematic circuit diagram for a prototype circuit for use with and as part of the invention.

As can best be understood by review of FIGS. 4A and 4B, shutter actuators 3A, 3B each include rotor magnets 10 having polarizations denoted by a polarization indicator "N" positionable between a first pole 20A and a second pole 20B of two arms of a stator 20 in each of the shutter actuators 3A, 3B. (In this specification and in the claims that follow, the term "magnet" is reserved for a non-electromagnet). Each said stator 20 is, in turn, wrapped by electromagnet drive coils 30A, 30B in, respectively, the shutter actuators 3A, 3B such that it can serve as an electromagnet with its polarization determined by the direction of current in its respective electromagnet drive coil 30A, 30B. This, in turn, can be used to create torque on rotors 10 so as to drive the pole "N" of each said rotor 10 to align with the first pole 20A of its respective stator 20 (as illustrated in FIG. 4A). Likewise, it can be used to create torque on rotors 10 so as to drive the poles "N" of rotors 10 to align with the second poles 20B of stators 20 (as illustrated in FIG. 4B). And, since blades 2A, 2B are directly linked to rotors 10 (via, e.g., pegs 40 or some other means), blades 2A, 2B rotate with rotors 10 between first poles 20A (where they are in an open position as illustrated in FIG. 4A), and second poles 20B (where they are in a closed position as illustrated in FIG. 4B).

The inventor has discovered that this arrangement is ideal for the use and positioning of a non-optical sensors responding to the positions of the magnets 10 rather than (as in prior art) directly interacting with and being responsive to the positions of shutters 2A, 2B. Thus, in the embodiment illustrated, sensors 5A, 5B are located proximate to and abutting the poles of stators 20 and respond to the proximity of poles "N" of rotors 10 to the said stator poles. Sensors 5A, 5B are preferably Hall Effect sensors producing voltages when the poles "N" of rotors 10 are proximate Hall Effect sensors 5A, 5B.

Hall Effect sensors 5A, 5B output either a high or low signal (rather than a proportional signal) in the preferred embodiment illustrated. Thus, they can be seen as threshold devices. Once the magnetic field gets above a certain value the Vout goes from low to high. Then, the magnetic field must reverse in direction for the Vout of the Hall IC sensors 5A, 5B to switch from High to Low. (The hysteresis of these devices is such that, once they have switched, the field needs to be completely reversed and achieve a given magnitude before the output state flips). There are Hall Effect devices available that do not require a field reversal but still yield a high or low output and there are also some that offer a proportional output. All of these could possibly be implemented to sense blade positions in the instant invention, but the style described is advantageous and preferred for the purposes of the invention.

The system of the invention could be arranged with sensors 5A, 5B adjacent stator poles associated with a closed blade/shutter configuration (i.e., second poles 20B), or arranged with sensors 5A, 5B adjacent stator poles associated with an open blade/shutter configuration (i.e., first poles 20A). In the first case, the high voltage reading/signal would correspond to a closed aperture 4 blade/shutter configuration and the low voltage reading/signal would correspond to an open aperture 4 blade/shutter configuration. In the second case, the high voltage reading/signal would correspond to an open aperture 4 blade/shutter configuration and the low voltage reading/signal would correspond to a closed aperture 4 blade/shutter configuration. (Alternatively, in either the first or second case, the opposite of the output results specified could be achieved by merely flipping the sensors 5A, 5B, so that the field is moving in the opposite direction through the devices). Any of these arrangements could be used for the purposes of this invention, but the second case has been chosen as exemplary and is illustrated in the drawing figures.

Figures 5, 6:
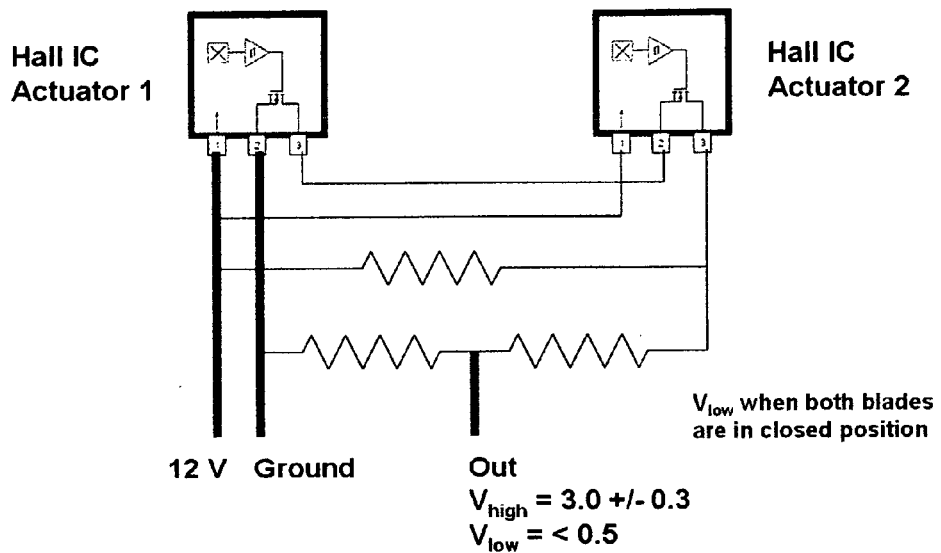
FIG. 6 provides a chart of voltage read-outs related to the function and detectable output of the sensor based on different rotor/shutter positions.

Thus, as will be noted from review of FIGS. 3A through 3D in conjunction with FIG. 6, based on the second case configuration chosen for illustrative purposes, the low voltage reading is obtained only when both shutters 2A, 2B are closed. Internal hysteresis of the Hall Effect sensors 5A, 5B ensures that the blades 2A, 2B are more than ½ way through their respective strokes before their respective sensors 5A, 5B will change states. A simple voltage divider circuit may be utilized to yield the desired values for Vhigh and Vlow. An exemplary circuit is illustrated in FIG. 5 that also provides greater flexibility of drive voltages and offers further logic outputs.

In view of the foregoing, it should be clear that numerous changes and variations can be made without exceeding the scope of the inventive concept outlined herein. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A shutter blade position sensing system, comprising:
a rotor driving a shutter blade such that the position of the rotor is indicative of the position of the shutter blade;
a non-optical sensor responsive to the rotor signaling the position of the shutter based on the position of the rotor; and
wherein a driving magnet for said rotor produces a magnetic field and the sensor is responsive to said magnetic field.

2. The shutter blade position sensing system of claim 1, further comprising:
an electromagnetically drivable stator having two ends adapted to serve as electromagnetic poles, said ends comprising a first stator pole and a second stator pole;
an electromagnet drive coil wound around and cooperating with said stator; and
wherein said rotor is a magnet cooperating with said first stator pole and said second stator pole.

3. A shutter blade position sensing system, comprising:
a rotor driving a shutter blade such that the position of the rotor is indicative of the position of the shutter blade;
a non-optical sensor responsive to the rotor signaling the position of the shutter based on the position of the rotor, said rotor producing a magnetic field and the sensor being responsive to said magnetic field;
an electromagnetically drivable stator having two ends adapted to serve as electromagnetic poles, said ends comprising a first stator pole and a second stator pole;
an electromagnet drive coil wound around and cooperating with said stator;
wherein said rotor is a magnet cooperating with said first stator pole and said second stator pole; and
wherein alignment of a pole of said magnet with said first stator pole indicates the shutter blade position is open, and alignment of said pole of said magnet with said second stator pole indicates the shutter blade position is closed.

4. The shutter blade position sensing system of claim 3, wherein at least one of: said sensor is positioned adjacent one of said stator poles, said sensor is responsive to alignment of the pole of said magnet with one of said stator poles, and said sensor is positioned adjacent said first stator pole.

5. The shutter blade position sensing system of claim 4, wherein said sensor is a Hall effect sensor producing a voltage, and said voltage is greatest when the pole of said magnet is proximate the Hall effect sensor.

6. A shutter blade position sensing system, comprising:
a plurality of rotors driving blades of a shutter such that the position of the rotors is indicative of the position of the shutter blades; and
non-optical sensors responsive to the rotors signaling the position of the shutter blades based on the position of the rotors.

7. The shutter blade position sensing system of claim 6, wherein said rotors produce magnetic fields, and said sensors are responsive to said magnetic fields.

8. The shutter blade position sensing system of claim 7, further comprising:
a plurality of electromagnetically drivable stators, each of said plurality of electromagnetically driven stators cooperating with one of said plurality of rotors and having two ends adapted to serve as electromagnetic poles, said ends comprising first stator poles and second stator poles;
electromagnet drive coils wound around and cooperating with said plurality of stators; and
wherein said rotors are magnets cooperating with said first stator poles and said second stator poles.

9. The shutter blade position sensing system of claim 8, wherein alignment of a pole of each of said plurality of magnets with said first stator poles indicates the shutter blade position is open, and alignment of said pole with said second stator pole indicates the shutter blade position is closed.

10. The shutter blade position sensing system of claim 9, wherein at least one of: sensors are positioned adjacent stator poles, sensors are responsive to alignment of the pole of magnets with stator poles, and sensors are positioned adjacent first stator poles.

11. The shutter blade position sensing system of claim 10, wherein said sensors are Hall effect sensors producing voltages, and said voltages are greatest when the poles of magnets are proximate the Hall effect sensors.

12. The shutter blade position sensing system of claim 7, wherein alignment of a pole of each of said plurality of magnets in a position proximate said sensors indicates a position of the shutter blades and alignment of said poles in a position distant said sensors indicates an other position of said shutter blades.

13. The shutter blade position sensing system of claim 12, wherein alignment of a pole of each of said plurality of magnets in a position proximate said sensors indicates said shutter blades are in an open position, and alignment of said poles in a position distant said sensors indicates said shutter blades are in a closed position.

14. The shutter blade position sensing system of claim 12, wherein said sensors are Hall effect sensors producing voltages, and said voltages are greatest when the poles of magnets are proximate the Hall effect sensors.

* * * * *